United States Patent [19]

Kleiner

[11] 4,415,007

[45] Nov. 15, 1983

[54] APPARATUS FOR EFFECTING BACK-AND-FORTH MOVEMENT OF A GUIDE SYNCHRONOUSLY WITH THE INTERMITTENT ROTARY MOVEMENT OF A SHAFT

[75] Inventor: Walter Kleiner, Hirzel-Zuerich, Switzerland

[73] Assignee: Staeubli Ltd., Horgen-Zuerich, Switzerland

[21] Appl. No.: 292,106

[22] Filed: Aug. 11, 1981

[30] Foreign Application Priority Data

Aug. 18, 1980 [CH] Switzerland ........................ 6203/80

[51] Int. Cl.3 ........................ D03C 1/24; D03C 1/22; D03C 3/34

[52] U.S. Cl. .................................... 139/329; 139/1 E; 139/68; 139/331

[58] Field of Search ........... 139/331, 329, 324, 68.1 E

[56] References Cited

U.S. PATENT DOCUMENTS 4,067,364 1/1978 Tomio ................................ 139/329

FOREIGN PATENT DOCUMENTS 1535263 1/1970 Fed. Rep. of Germany .

969951 5/1950 France ............................... 139/1 E 352638 4/1961 Switzerland ......................... 139/68

*Primary Examiner*—James Kee Chi

*Attorney, Agent, or Firm*—Flynn, Thiel, Boutell & Tanis

[57] ABSTRACT

An apparatus for controlling a dobby in which reading needles read a punch card and each needle influences the movement of a respective heddle frame. Two outer disks having annular toothed portions arranged on the axial facing sides thereof which face one another are secured on the shaft of a punch card drive cylinder. The teeth of the toothed portions are angularly offset by one-half the tooth pitch. Between the two outer disks, and freely rotatably supported on the shaft is a central disk with annular toothed portions on the axially facing sides thereof which are also offset by one-half the tooth pitch. A movable guide member for the reading needles is secured on and driven reciprocally by the central disk. Upon indexing the pattern card for one pick, the toothed portion of one outer disk moves the central disk toward the second outer disk and effects engagement of the facing toothed portions on the central disk and the second outer disk. Through the movement of the central disk, the guide member and thus the reading needle are moved so that the needle reads the following pick from an adjacent row of control points on the card.

8 Claims, 5 Drawing Figures

1
2
3
5
6
30
4
40

712
720'
72'
71
74
73
75
70'
700'
710

APPARATUS FOR EFFECTING BACK-AND-FORTH MOVEMENT OF A GUIDE SYNCHRONOUSLY WITH THE INTERMITTENT ROTARY MOVEMENT OF A SHAFT

FIELD OF THE INVENTION

The invention relates to an apparatus for effecting back-and-forth movement of a member in synchronism with a rotating drive shaft and, more particularly for effecting back-and-forth movement of the guide member for the reading needles of or the pattern card drive cylinder of a dobby.

BACKGROUND OF THE INVENTION

Swiss Pat. No. 333 144 describes a dobby mechanism in which a reading needle which controls a heddle frame alternately reads control points from two adjacent rows on a pattern card, and thus reads consecutively the even and uneven picks. For this purpose, all reading needles are supported in a guide which carries out, during each lifting operation of the needles and the indexing of the drive cylinder of the pattern card, a lateral back-and-forth movement.

The lifting of the needles from the pattern card, the movement of the needle guide member, and the indexing of the card cylinder must occur, particularly in high speed dobbies, in an extremely small amount of time, whereby all such movements must be tuned satisfactorily to one another.

It is known to control the needle guide member, for example through a wobble plate. The need for space and for lubrication of the wobble plate which is read by a roller is significant. Also, it is possible for oil to be sprayed away from the wobble plate, as a result of which the pattern card can become dirty. Furthermore, considerably high specific stresses of the utilized material and a corresponding wear is created at the contact point of the roller on the roller path of the wobble plate.

A primary purpose of the invention is thus to overcome these disadvantages with a simple, compact and precisely operating apparatus.

SUMMARY OF THE INVENTION

This is achieved by providing an apparatus of the above-mentioned type which has first and second outer disks arranged fixedly on a shaft and, therebetween, a third central disk arranged rotatably on the shaft. The member which is to be moved reciprocally is supported in guide openings of the dobby and is secured to the central disk. The two outer disks have on the axially facing surfaces thereof which face each other and the central disk has on each of its two axially facing surfaces an annular toothed portion. The engaging annular toothed portions on the outer disk are periodically moved one-half their tooth pitch relative to the annular toothed portions on the central disk when the shaft is periodically indexed.

Initially, one toothed portion of the central disk engages the toothed portion of a first outer disk. During rotation of the shaft, the toothed portion of the first outer disk pushes on the toothed portion of the central disk and, since the central disk cannot rotate, moves the central disk axially into engagement with the second outer disk.

The axial movement of the central disk occurs automatically, since the surfaces of the annular toothed portions which are in pairs, due to the jointless engagement of the teeth, slide across one another.

BRIEF DESCRIPTION OF THE DRAWINGS

Exemplary embodiments of the subject matter of the invention, as used in a dobby, are illustrated in the drawings, in which.

DETAILED DESCRIPTION

Figure 3:
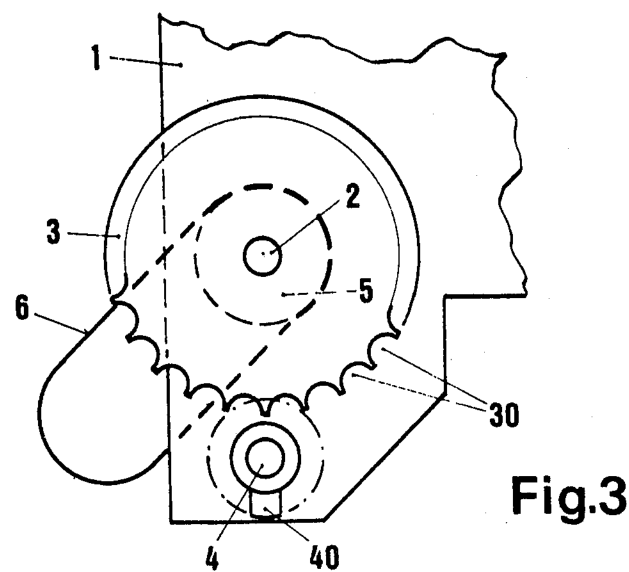
FIG. 3 is a front view of the apparatus of FIG. 1 and illustrates a mechanism for effecting a step-by-step indexing of the pattern card drive cylinder.

A shaft 2 is freely rotatably supported by and extends between two spaced side or frame plates 1 of a dobby. The shaft 2 is not movable axially. A ratchet gear 3 is secured on the shaft 2. A drive projection 40 is supported on a sleeve 4 mounted on a rotating drive shaft 4A and engages periodically the tooth spaces 30 (FIG. 3) of the ratched gear 3 and thereby effects an intermittent indexing of the gear 3, a drive cylinder 5 on the shaft 2 (FIG. 1) and thus the pattern card 6. During the times between the indexing operations, the ratchet gear 3 is secured by a conventional and not illustrated ratchet mechanism against inadvertent rotation.

Furthermore, in addition to the drive cylinder 5 which carries the pattern card 6, three disks 70, 71 and 72 are supported on the shaft 2 of the drive cylinder 5, the two axially outer disks 70 and 72 being fixedly secured on the shaft 2 and the center disk 71 therebetween being supported rotatably with respect to the shaft. The two outer disks 70 and 72 each have on an axially facing side thereof, directed to face one another, a respective annular toothed portion 700 and 720. The center disk 71 has on each axially facing side thereof a respective annular toothed portion 710 and 712.

One or more reading needles 8 are supported in a conventional manner at 80 and extend slidably through bores 98 (FIG. 2) in a guide member 9 which is slidably supported in rectangular windows 90 provided in the plates 1 and is secured to the center disk 71 by a screw connection 97.

The reading needles are controlled by a control mechanism 800 which is conventional and therefore not discussed in detail. The control mechanism 800 could, for example, be that disclosed in U.S. Pat. No. 3,381,719.

The operation of the drive mechanism is, beginning from the position illustrated in FIG. 1, as follows. The ratchet gear 3 is rotated or indexed an angular distance equal to its tooth pitch by each rotation of the drive shaft 4, due to engagement of the drive member 40 with a tooth space 30 of the gear 3. With this, the shaft 2 rotates the card cylinder 5 and the two outer disks 70 and 72 through the same angle of rotation as the gear 3. This means, as described hereinafter, with respect to the pattern card which lies on the cylinder, the switching of the reading needle 8 between the line which includes the control points 63, 65, 67 and 69 for an even pick and the line which includes the control points 64, 66 and 68 for an uneven pick, and so on. After each successive rotation of the shaft 4A, the reading needle 8 alternately reads an uneven control point 63, 65, 67 and 69 or an even control point 64, 66 and 68.

Figure 1:
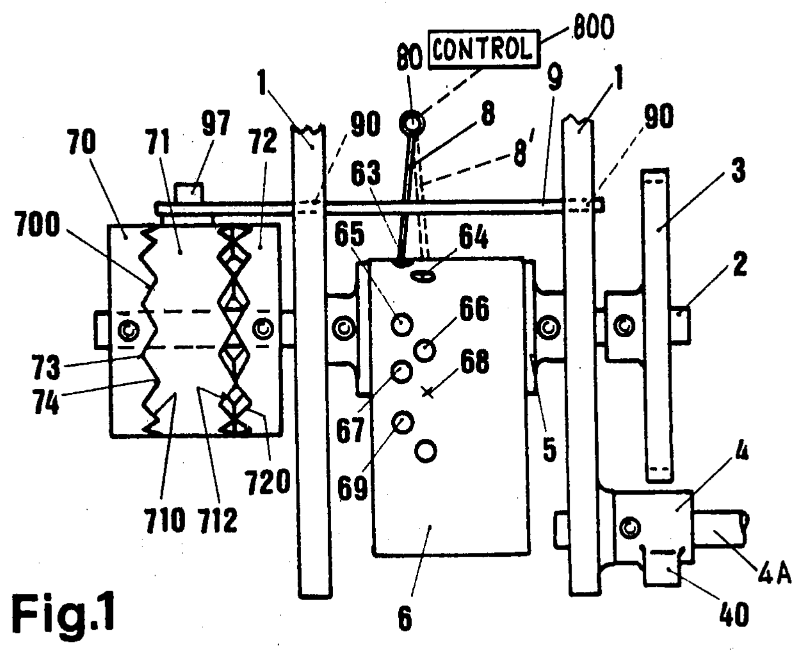
FIG. 1 is a side view of part of a dobby embodying the present invention.

With respect to the position of FIG. 1, indexing of the gear 3 through the angle of rotation equal to the tooth pitch means that the surfaces of the teeth of the toothed portion 700 on the left disk 70 slide on the surfaces of the teeth of the toothed portion 710 of the center disk 71. Since the disk 71 is held against rotation by the guide member 9 and the screw connection 97, the disk 71 is pushed to the right by and relative to the disk 70. The teeth of the right toothed portion 712 of the center disk 71 are thus moved into engagement with the teeth of the toothed portion 720 of the right outer disk 72 which rotates with the shaft 2. The center disk 71, during its axial movement, effects movement of the guide member 9 parallel to the shaft 2 through the screw connection 97 and thereby controls movement of the reading needle 8, which in the meantime has been lifted from the card 6 by not-illustrated structure in a conventional manner, into the position 8' for reading an uneven pick or control point 64, 66 or 68.

During the next indexing rotation of the ratchet gear 3 a return movement of the guide member 9 occurs, due to the fact that the outer disk 72 now moves the center disk 71 to the left to the position of FIG. 1.

Figure 2:
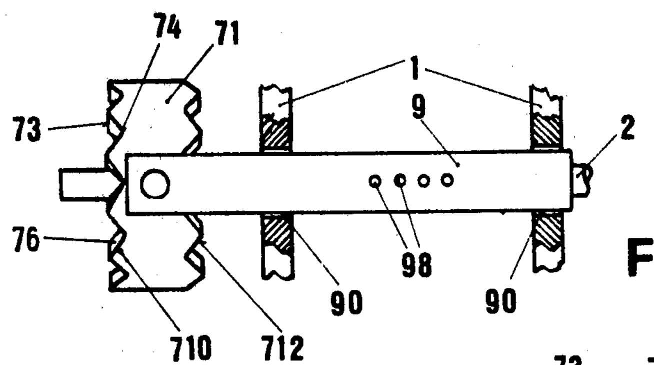
FIG. 2 is a fragmentary top view of the apparatus of FIG. 1 with certain structural elements omitted for clarity.
Figure 4:
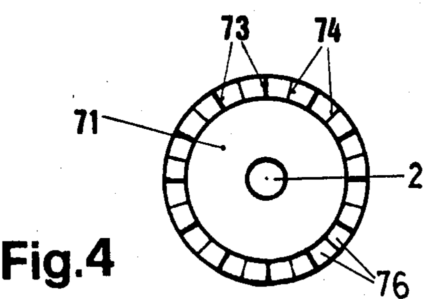
FIG. 4 is a front view illustrating the annular toothed portion of a disk which is a component of the apparatus of FIG. 1.

As illustrated in FIGS. 1, 2 and 4, the teeth of the annular toothed portions 700, 710, 712, 720 consist of approximately radially extending and linear crests 73 and valleys 74 which are connected by flat surfaces 76. The spacing between the disks 73 and 74 is such that the crests 73 of the teeth of the toothed portion pairs 700, 710 and 712, 720 lie approximately in the same radial plane in the unengaged condition, namely, the tips of the crests 73 on adjacent toothed portions contact one another in the uncoupled condition, as shown in FIG. 1 for the pair 712, 720.

A not-illustrated modification of the foregoing embodiment consists of the circumferential outline of each toothed portion being, instead of a zigzag line as shown in FIG. 1, an approximately wave-shaped outline, such as a sine wave.

Figure 5:
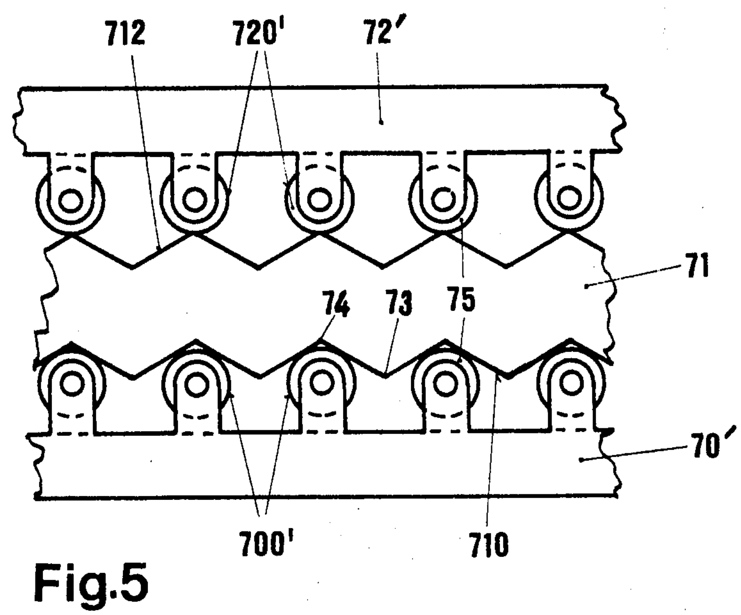
FIG. 5 illustrates an alternative embodiment of the annular toothed portions on disks which are components of the apparatus of FIG. 1.

FIG. 5 illustrates an alternative embodiment of the disks 70 and 72 of FIGS. 1–4. The center disk 71 is identical to that already described. The respective toothed portions 700' or 720' of the outer disks 70' or 72', which toothed portions engage the toothed portions 710 and 712, consist of a plurality of teeth which are circumferentially spaced rollers 75 or, alternatively, not-illustrated balls. The number of rollers 75 per annular toothed portion preferably corresponds to the number of the crests 73 or the number of valleys 74 in the tooth system already described. It is also, however, possible to provide a roller 75 only for every second or third crest or valley. The resulting system thus has the general shape of a star.

During the movement of the disk 71 relative to the disks 70, 72 or 70', 72', wherein the latter cannot move sideways, the center disk 71 moves automatically back and forth synchronously with the indexing of the shaft 2.

For this operation, it is important that the two outer toothed portions 700 and 720 are indexed in steps equal to half the tooth pitch by the shaft 2 and that the number of teeth around the circumference of each toothed portion is preferably half the minimum number of picks or reads which can be programmed onto the card cylinder, namely half the number of teeth on the ratchet gear 3.

Up to now it has been described that the reading ends of the needles 8 are moved back and forth in the axial direction of the shaft 2 during the period of the lifting of the needles. The same effect is achieved if the reading needles remain stationary, namely, they move up and down only in their longitudinal direction for the purpose of reading, and the back-and-forth movements are carried out by the pattern card. This can be done by effecting a back-and-forth movement of the pattern card cylinder, for example by supporting the shaft 2 for limited axial movement and maintaining the center disk stationary.

From the drawings and the foregoing description, one can clearly understand how little space the moving mechanism requires and how it acts directly on the needle guide member to permit increased operating speed and a secure movement. Since the moving forces are distributed uniformly on all teeth of the disks, a minimal load on each tooth surface is the result. Accordingly, the cost of maintenance and lubrication is low, in particular because the use of plastic for the toothed rims is possible, due to small loads involved. Also, since lubrication can be reduced to a minimum, the pattern card does not become dirty from oil flying around.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus which includes a rotatably driven shaft, a member supported for movement in a direction which is approximately parallel to said shaft, and means for effecting back-and-forth movement of said member in synchronism with rotational movement of said shaft, the improvement comprising first and second spaced outer disks fixedly supported on said shaft and a central disk axially slidably supported on said shaft and fixed against rotation therewith, said member being secured to said central disk, said first and second disks each having on an axially inwardly facing surface thereof an annular tooth system which is concentric to said shaft, and said central disk having on each of two axially facing surfaces thereof an annular tooth system which is concentric to said shaft, the angular spacing between adjacent teeth of each said tooth system being a common, predetermined value, said tooth systems on said outer disks being angularly aligned and said tooth systems on said central disk being angularly offset with respect to each other by half said predetermined value.

2. The apparatus according to claim 1, wherein said outer disks are positioned on said shaft so that, when said tooth system of one said outer disk is fully engaging the associated tooth system on said central disk, the crests of the other said tooth system on said central disk and said tooth system on the other outer disk are angularly aligned and contact one another.

3. The apparatus according to claim 1, wherein said shaft is rotated in discrete angular steps which are each half said predetermined value and said member carries out said back-and-forth movements in response to successive said discrete angular step movements of said shaft, whereby the number of discrete angular steps of said shaft required to effect one complete revolution thereof is twice the number of teeth in each of said annular tooth systems on said outer and central disks.

4. The apparatus according to claim 1, wherein said tooth systems each have a circumferential outline which is one of zigzag and a sine wave.

5. The apparatus according to claim 1, wherein the teeth of at least one of said tooth systems are rollers which roll over the teeth of the associated tooth system to effect said reciprocal movement of said member.

6. In an apparatus which includes a rotatably driven shaft, a member supported for movement in a direction approximately parallel to said shaft, and means for effecting reciprocal movement of said member in response to and synchronously with rotation of said shaft, the improvement comprising first and second elements fixedly supported on said shaft and respectively having axially spaced, axially inwardly facing first and second surfaces thereon, said first and second surfaces each having thereon an annular tooth system which is concentric with respect to said shaft, and including a central member disposed between said first and second surfaces, supported for movement axially of said shaft, fixed against rotation with said shaft, and having third and fourth surfaces thereon which respectively face said first and second surfaces and which each have thereon an annular tooth system which is concentric with respect to said shaft, wherein when said annular tooth systems on said first and third surfaces are fully engaged, so that each tooth thereof is angularly aligned with and received in a space between two adjacent teeth of the other tooth system, the teeth of said tooth systems on said second and fourth surfaces are angularly aligned and the crests thereof are adjacent.

7. The apparatus according to claim 1 or claim 6, including a drive cylinder fixedly and coaxially supported on said shaft for rotation therewith, a pattern card extending over and operatively driven by rotation of said drive cylinder and having first and second rows of spaced control points extending therealong parallel to the direction of movement thereof, said pattern card having perforations at a plurality of said control points, a reading needle supported for lengthwise movement toward and away from said pattern card, the end of said reading needle nearest said pattern card extending slidably through an opening provided in said member, said reciprocal movement of said member effecting reciprocal movement of said end of said reading needle axially of said shaft between two positions in which it is respectively aligned with control points in said first and second rows of control points.

8. A dobby for controlling a weaving machine, comprising a rotatably driven shaft; a drive cylinder fixedly and coaxially supported on said shaft for rotation therewith; a pattern card extending over and operatively driven by rotation of said drive cylinder, said pattern card having axially spaced first and second rows of control points extending therealong substantially in the direction of movement thereof and having perforations at a plurality of said control points; an elongate guide member spaced from and extending substantially parallel to said shaft and drive cylinder, having an opening therethrough, and supported for movement in a direction generally parallel to said drive cylinder and shaft between first and second positions; a reading needle supported for lengthwise movement toward and away from said pattern card approximately normal thereto, the end of said reading needle nearest said pattern card extending slidably through said opening in said guide member; said end of said reading needle being aligned axially with said first and second rows of control points when said guide member is respectively in said first and second positions; means defining first and second annular, axially spaced tooth systems which are coaxial with and fixed against rotation relative to said shaft and which each include a plurality of angularly spaced teeth, means defining a first tooth and a second tooth on said guide member which are respectively engageable with teeth of said first and second tooth systems when said guide member is in said first and second positions, engagement of said first tooth with a tooth of said first tooth system in response to rotation of said shaft and tooth systems causing said guide member to be moved from said first position to said second position, and engagement of said second tooth with a tooth of said second tooth system in response to rotation of said shaft and tooth systems causing said guide member to be moved from said second position to said first position.

* * * * *